US008756439B1

(12) United States Patent
Jannson et al.

(10) Patent No.: US 8,756,439 B1
(45) Date of Patent: Jun. 17, 2014

(54) ENCRYPTION KEY MANAGEMENT FOR SECURED ACCESS

(75) Inventors: Tomasz Jannson, Torrance, CA (US); Thomas Forrester, Hacienda Heights, CA (US); Kevin Duane Degrood, Lomita, CA (US); Kathy Mai Nguyen, Santa Ana, CA (US); Andrew Kostrzewski, Garden Grove, CA (US); Kang Lee, Woodland Hills, CA (US); Eric Gans, Los Angeles, CA (US); Kevin Carl Walter, Aliso Viejo, CA (US)

(73) Assignee: Physical Optics Corporation, Torrance, CA (US)

( * ) Notice: Subject to any disclaimer, the term of this patent is extended or adjusted under 35 U.S.C. 154(b) by 119 days.

(21) Appl. No.: 12/871,147

(22) Filed: Aug. 30, 2010

Related U.S. Application Data

(60) Provisional application No. 61/238,005, filed on Aug. 28, 2009.

(51) Int. Cl.
*G06F 21/00* (2013.01)

(52) U.S. Cl.
USPC ............... 713/193; 713/189; 726/26; 726/27; 726/30; 380/279; 380/281; 380/282; 380/286

(58) Field of Classification Search
None
See application file for complete search history.

(56) References Cited

U.S. PATENT DOCUMENTS

| | | | | |
|---|---|---|---|---|
| 7,069,591 | B1* | 6/2006 | Weicher | 726/26 |
| 2004/0193903 | A1* | 9/2004 | Asoh et al. | 713/193 |
| 2008/0065898 | A1* | 3/2008 | Greco et al. | 713/185 |
| 2008/0098409 | A1* | 4/2008 | Nassar | 719/321 |
| 2009/0172416 | A1* | 7/2009 | Bosch et al. | 713/193 |
| 2009/0293132 | A1* | 11/2009 | Henry et al. | 726/27 |
| 2010/0131994 | A1* | 5/2010 | O'Brien | 725/93 |
| 2010/0332635 | A1* | 12/2010 | Rogel et al. | 709/223 |

* cited by examiner

*Primary Examiner* — Kaveh Abrishamkar
*Assistant Examiner* — Adrian Stoica
(74) *Attorney, Agent, or Firm* — Sheppard Mullin Richter & Hampton LLP

(57) ABSTRACT

A non-transient computer usable medium has computer usable instructions embodied thereon, the computer usable instructions configured to cause a computer device to perform the steps of receiving an intermediate program code prior to execution of the intermediate program code; recognizing data storage commands within the intermediate program code; modifying the intermediate program code such that, during execution of the intermediate program code, the data is encrypted before it is stored; recognizing data retrieval commands within the intermediate program code; modifying the intermediate program code such that, during execution of the intermediate program code, the data is decrypted after it is retrieved; and providing the modified intermediate program code for execution.

13 Claims, 8 Drawing Sheets

ENCRYPTION KEY MANAGEMENT FOR SECURED ACCESS

CROSS-REFERENCE TO RELATED APPLICATIONS

This application claims the priority of U.S. Provisional Application No. 61/238,005, filed on Aug. 28, 2009, which is hereby incorporated herein by reference in its entirety.

TECHNICAL FIELD

The present invention relates generally to encrypted communication systems, and more particularly, some embodiments relate to key management in encrypted communication systems.

DESCRIPTION OF THE RELATED ART

In many embedded systems, data exchanged among the processor, memory buses, and internal memory modules are typically unencrypted. These data may be confidential. Given physical access to the embedded system, an adversary can potentially access the data in these systems. Embedded systems are increasingly used in applications where high-security is desirable. For instance, embedded systems are used increasingly to manage financial accounts or to transmit confidential information. Costly hardware based internal encryption often requires application specific development and is not applicable to widely available embedded systems such as common smartphones and personal digital assistants. Additionally, key management can be the most difficult aspect of any cryptographic system, typically requiring system policy, user training, organizational, and departmental considerations and coordination between these levels.

BRIEF SUMMARY OF EMBODIMENTS OF THE INVENTION

According to various embodiments of the invention, a key server is configured to distribute encryption keys to embedded systems. The embedded systems use the received keys for internal memory encryption. In some embodiments, the embedded systems comprise an edge-embedded encryption module that monitors the operating system's stack and recognizing storage and retrieval commands. Data to be stored or retrieved is encrypted and decrypted, respectively using the distributed encryption keys. Accordingly, data maintained on the internal storage systems of the embedded systems is encrypted. In further embodiments, the embedded system can only be used by providing the encryption key used during a previous operation of the device. After the embedded system is used, the current encryption key serves as the initiation key for a subsequent use.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The security of computer devices, such as: computers (PCs, laptops, desktops), wireless phones, iPhones, smartphones, Mobile Internet Devices (MIDs), PDAs, etc., is vulnerable in two major ways, either physically, or by communication links. The communication links can be wired and wireless; the wireless ones are mostly RF-links, and IR-links (infrared links). The security principle applies to both. The RF-security is mostly protected by access security protocols, such as WPA and WPA2. Further embodiments of the invention are related to the physical security, in general, and to internal memory security (IMS), in particular.

The basic IMS problem is that the computer device can be stolen, tapped, or compromised another way by hostile party which can recall all device's internal memory and read any confidential, sensitive, proprietary, or other private and official data. This memory data can be encrypted by some cryptographic system (module) including algorithm and secret key. Such cryptographic modules have been standardized by NIST, including AES (Advanced Encryption Standard) used by ANSI (American National Standard Institute), and NSA (National Security Agency). The classical cryptography is symmetric cryptography, and public key asymmetric systems and trapdoor functions have been introduced only recently, in 1970s, such as the well-known RSA function. The other authentication solution is due to biometric systems, such as fingerprint recognition.

Figure 1:
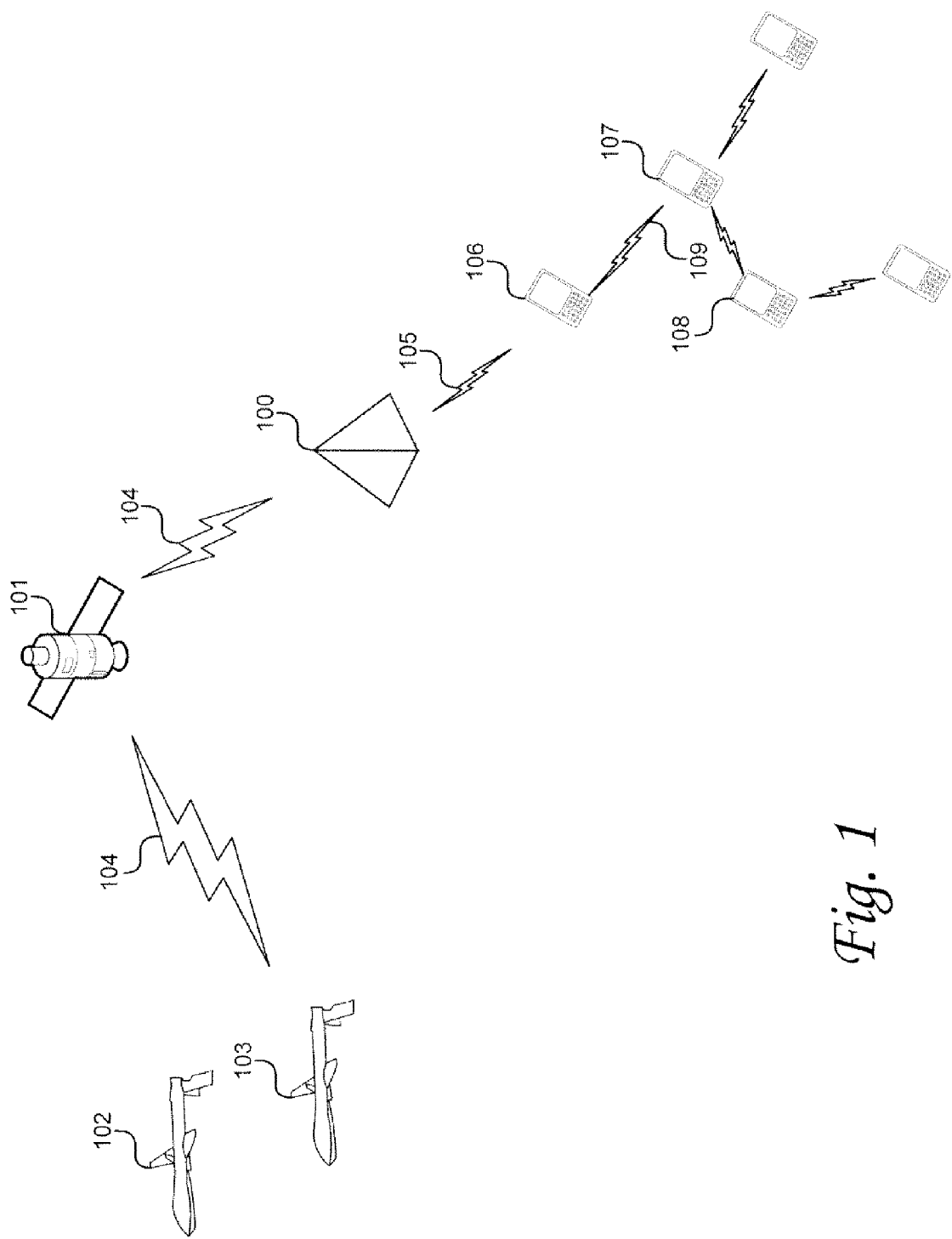
FIG. 1 illustrates an encryption key distribution system implemented in accordance with an embodiment of the invention.

FIG. 1 illustrates a cryptographic key management system implemented according to an embodiment of the invention. A key server 100 is configured to distribute cryptographic keys to embedded systems 106, 107, 108, 102 and 103 via communication links 105 and 104. The embedded systems may comprise, for example smartphones, PDAs, or mobile internet devices (MIDs) 106, 107, and 108, or other systems such as avionics or surveillance systems 102 and 103. The embedded systems are equipped with cryptographic authentication software modules (CASMs) that encrypt and decrypt the embedded systems' internal memories and internal communications. Activation of the embedded system during a particular operating session, Sn, requires use of a cryptographic key from a previous operating session, Sn-k, for authentication and initial decryption of the memory contents of the embedded system. Once Sn begins, a new key or plurality of keys is distributed and used for securing the embedded systems' internals. The new key may then serve as an authentication and initial decryption key for a future operating session. In further embodiments, the key must be updated within a certain time or else the memory of the embedded system will be automatically erased. Based on the transmission distance of links 104 and 105, this can place a physical proximity requirement between the key server 100 and the embedded systems. In some embodiments, this physical proximity requirement can be extended so that the embedded system need not be directly connected to the key server 100. For example, a communications relay such as satellite 101 may be used to extend the range of the embedded systems, or an embedded system 106 may serve as a communications relay to provide a link 109 to embedded systems 107 and 108 outside the physical range of the key server 100.

Various methods may be used for key exchange and authentication in different embodiments. For example, some embodiments may employ authentication methods from the Extensible Authentication Protocol framework, various password authenticated key agreement methods, public key infrastructures, and web of trust systems. Methods of key exchange include public key, such as RSA, encryption, key exchanges, such as Diffe-Hellman key exchange, three-pass protocols, shared symmetric key derivation methods, or other key exchange methods. In a particular embodiment, a public key exchange method is used. The embedded system is equipped with a private key and the key server 100 is equipped with a public key. The session initiation key (i.e. the key from the previous operating session) is then encrypted using the public key and transmitted to the embedded system. As the sole holder of the private key, the embedded system is the only entity capable of decrypting the session initiation key. If the session initiation key is correct, then the memory contents can be decrypted and the operating session can resume. When key transmission and reception methods are described herein, it will be understood that this does not necessarily mean that an encryption key is literally transmitted or received. Rather, the description includes transmission of various primitives or other information used by the systems to derive a key.

Figure 2:
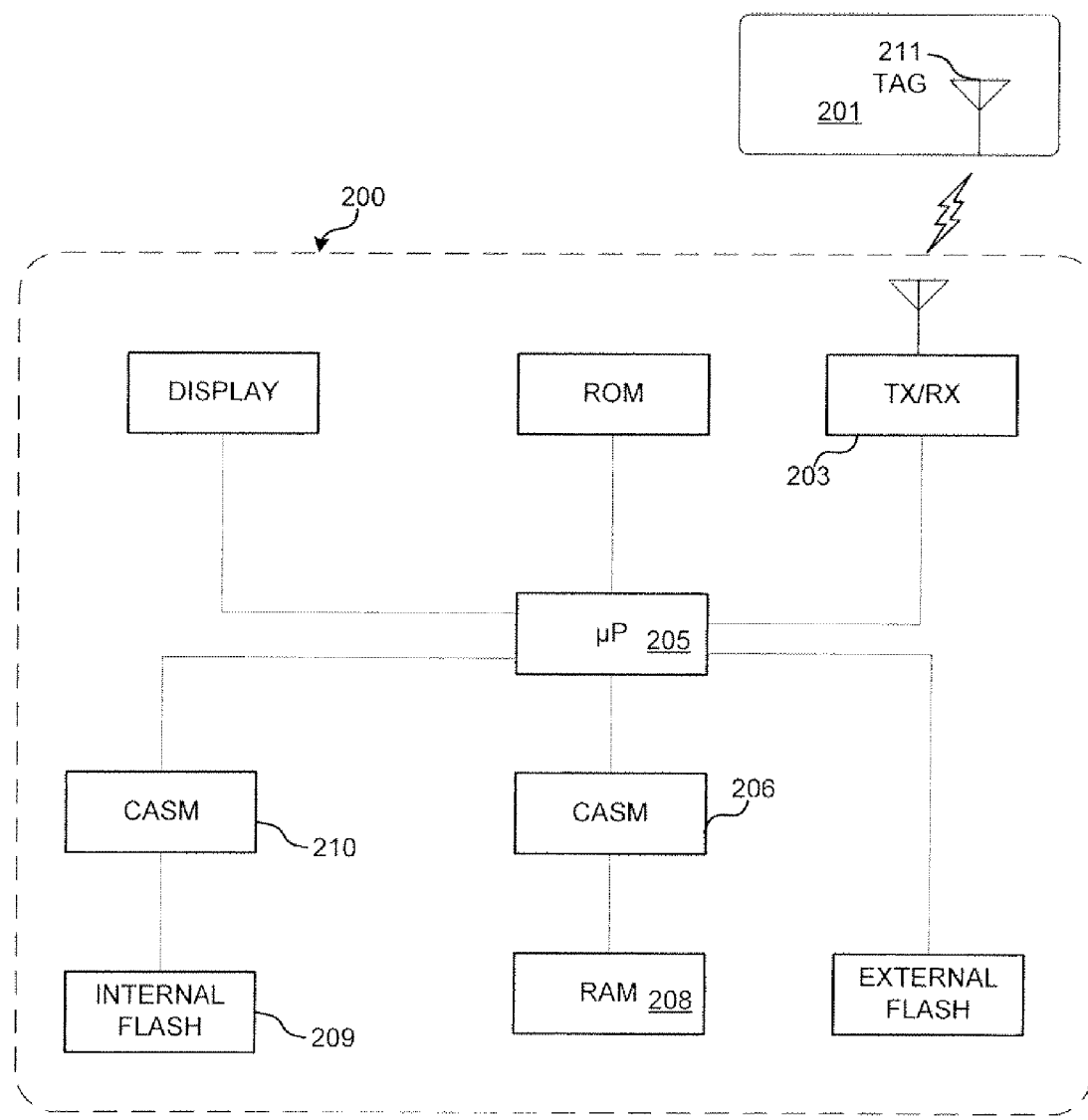
FIG. 2 illustrates an encryption key server and embedded system implemented in accordance with an embodiment of the invention.

Illustrated in FIG. 2, some embodiments of the invention comprise wireless security tags 201 that interface with computing devices programmed with wedge-embedded, or wrapper-embedded software in the form of cryptographic authentication software modules (CASMs) 210, installed between the device's 200 microprocessor (µP) 205 and internal memory such as RAM 208, or internal flash memory 209. Using a token or passkey provide by the security tag 201, the CASMs 210 and 206 encrypt and decrypt data transferred between the microprocessor 205 and the internal flash 209 and RAM 208, respectively.

In the illustrated embodiment, the CASM software module 206 is a wedge (or wrapper) between the microprocessor 205 and RAM 208, or internal flash memory 209 (in the case of CASM module 210), or other internal memory for internal security purposes. It applies at least one of the following OSI layers: #2 (Link: firmware); #4 (TCP); #3 and #4 (TCP/IP): #5 (Session); and #7 (Application). SEDI (Sensitive Data Interception) is typically applied for CASMs, for encryption and decryption of data stored in internal RAM and flash memories.

In some embodiments, a CASM is a software module at an operating system level layer of an embedded system. For example, an embedded system such as PDA 200 may be programmed with a real time operating system (RTOS). The typical RTOS systems are: Microsoft Windows CE (Window embedded Compact), including Windows Mobile 5.0, or Windows CE/M; .NET Compact Framework, based on C#(C-Sharp language); Embedded Linux; and Green Hills software such as INTEGRITY. In these embodiments, the programs utilizing the memory are hosted programs that run within the frameworks provided by the RTOS. The CASM modules run between the hosted programs and the framework such the memory access by the hosted programs is secured.

In one embodiment, the CASM uses data interception to scan the bytecode of a program being secured by the CASM. For instance, the CASM intercepts and inspects the CIL (Common Intermediate Language) or JBC (Java byte code) for the Microsoft and Sun distribution, respectively. A just-in-time (JIT) compiler is then introduced by either Microsoft's Common Language Runtime (CLR) or Sun's Java Runtime Environment (JRE) virtual machines to transfer the intermediate code into machine language. The insertion of crypto functions cells by the CASM will still really be apparent for inspection of the managed code (MC) files. Additionally, the CIL can be modified by using custom libraries. In one embodiment, the CASM scans the intermediate language and inserts an encryption function drawn from the custom library when the program stores a value to memory. In this embodiment, the CASM further inserts a decryption function drawn from the custom library when the program loads a value from memory. An alternative embodiment can include hardware additions, especially in the case a second radio transceiver will be used (e.g., in addition to Wi-Fi 2.4 GHz, a 916 kHz-radio) for RF interference minimization purposes.

In some embodiments, the data interception may be performed at run-time. For example, the CASM module may operate as an add-on to the RTOS system to intercept the hosted program's intermediate language commands as they are executed. In another embodiment, the CASM module may be configured to manipulate the intermediate language prior to execution. For example, the CASM module may be configured to scan and modify any byte code or other intermediate language program as it is installed on the device. In this case, the CASM module may still operate during runtime to perform the encryption and decryption functions using keys received from the security tag 201.

Figure 3:
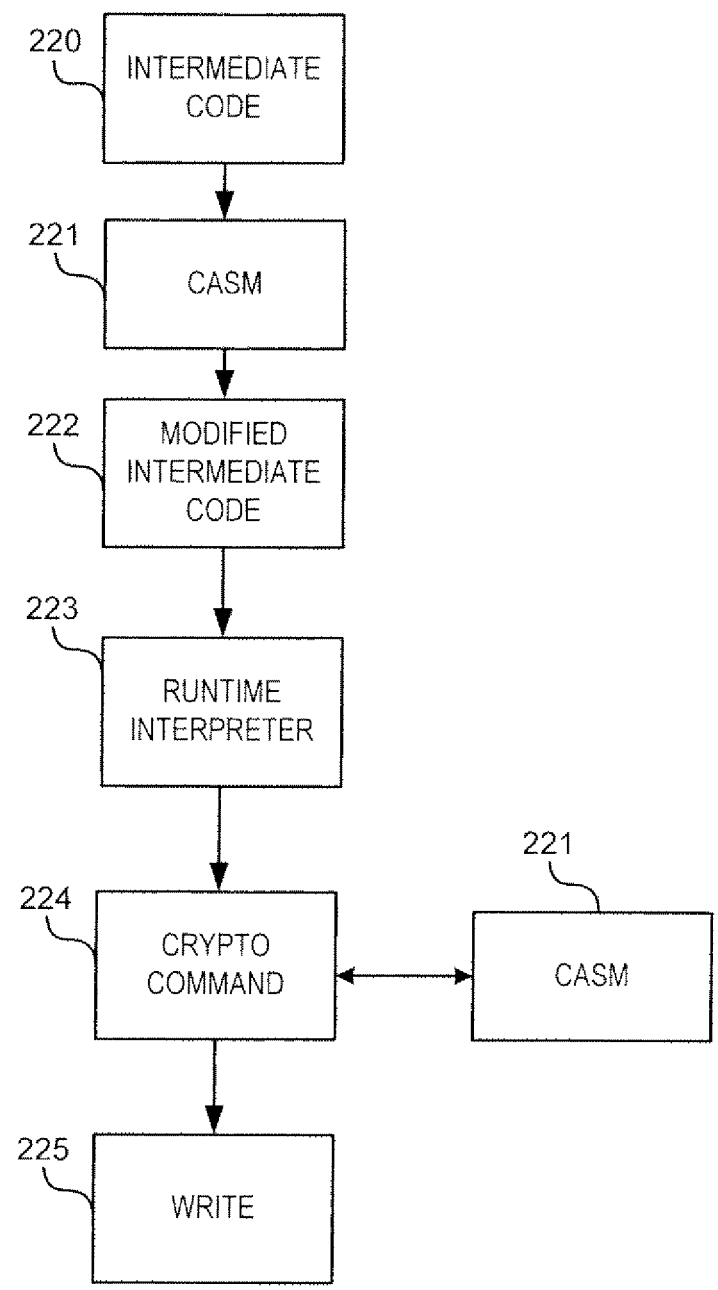
FIG. 3 illustrates a method of internal memory encryption implemented in accordance with an embodiment of the invention.

FIG. 3 illustrates the operation of a CASM module in accordance with an embodiment of the invention. In the illustrated embodiment, a program to be secured is provided to the system in the form of intermediate code 220. For example, the program might be a typical commercial off-the-shelf program that stores and reads data from internal memory during operations. Typically, this intermediate code is interpreted by an interpreter or just in time complier 223 at run-time. In the illustrated embodiment, a CASM software module 221 is provided on the system to modify the intermediate 220 to generate modified intermediate code 222. As discussed above, the modified intermediate code is configured to encrypt data before storage and to decrypt data upon retrieval. The modified intermediate code 222 is then provided to the runtime interpreter 223 for system execution. Because intermediate code 220 comprises an arrangement of known standard instructions determined according to the type of interpreter 223 employed by the system, the CASM module may search the intermediate code 220 for recognized standard commands that cause memory writes and memory reads. The write code portions may then be automatically modified to form an intermediate code with encryption functions inserted at write locations and decryption functions inserted at read locations. In other embodiments, the runtime interpreter 223 may be modified itself to recognize and encrypt and decrypt memory access. Alternatively, the runtime interpreter 223 may be modified to recognize custom instructions inserted into the intermediate code 222 by the CASM module 221. The custom instructions may then be used to encrypt and decrypt the memory using the security keys provided by the CASM software.

As the runtime interpreter 223 operates, cryptographic commands 224 that were inserted into the modified intermediate code 222 are recognized and run. In some embodiments, the cryptographic commands 224 in the modified intermediate code 222 may comprise commands to encrypt or decrypt data using an encryption key provided by the CASM module 221. In the illustrated embodiment, the cryptographic command 224 causes the embedded computer system to encrypt data to be written to internal memory using an encryption key from the CASM module 221. After the data is encrypted, the computer system writes 225 the data to internal memory. Later, if a data retrieval command to retrieve the encrypted data is recognized, a corresponding decryption command can retrieve the key from the CASM module 221 and decrypt the data.

Accordingly, in this embodiment, the CASM module acts as a "just-in-time modifier" to securely use a previously unknown program. The CASM module is transparent to the computer program being secured, and no special modifications or programming consideration are needed to secure the computer program. Likewise, the CASM module 221 is configured to utilize commands that are recognizable by the commercial runtime interpreter 223, so no special modifications or program consideration are needed to allow the modified computer program to run. Accordingly, so long as the CASM module 221 is connected to the security tag to allow it to retrieve encryption keys, the embedded system operates in a normal fashion, with its existence transparent to the system user. For example, a user may download a camera application onto the embedded computer system to allow the user to take pictures. During compilation of the downloaded application, the intermediate program code is scanned. Encryption commands from the CASM library are inserted before write commands, and decryption commands from the CASM library are inserted after read commands. The modified program is then compiled and executed. When the user, in vicinity of the key server that provides keys to the CASM module, takes a picture using the camera application, the picture is automatically encrypted before being written to internal memory, and is automatically decrypted when called from internal memory.

In other embodiments, the intermediate code may be complied prior to runtime. In these embodiments, the CASM module may be configured to scan the intermediate code during compilation, and insert appropriate cryptographic commands according to read and write commands in the intermediate code to generate a modified intermediate code for pre-runtime compilation. Later, during execution of the pre-compiled program, the CASM module can provide the cryptographic keys to the computer system as required by the prior inserted cryptographic commands.

The illustrated embodiment further comprises a security tag 201, which is a hardware and software sub-solution. In typical embodiments, the CASM software modules do not have authorization protocols (i.e., anybody in possession of the PDA could apply the software). In some embodiments, the authorization could be provided by some biometric system. However, for embodiments with increased security requirements a biometric system may be too complex and too easy to bypass by a sophisticated adversary. In these embodiments, a security tag 201 embodied in a separate form factor from the PDA 200 is configured to provide authorization to the CASM modules 206 and 210. The security tag 201 is configured with a transceiver 211 configured to communicate with a corresponding transceiver 203 in the PDA 200. In some embodiments, the transceivers 203 and 211 are standard 2.4 GHz wi-fi radios, for example as would be present on a commercial off the shelf PDA. In other embodiments, the PDA 200 further comprises a second transceiver for communications with the security tag 201, such as a 916 kHZ radio. Although these embodiments may have higher design complexity, the second radio may provide a higher degree of protection from RF interference and reduced detectability.

In further embodiments, a tag 201 may be further configured with additional components. For example, the tag may have a memory, such as an internal flash memory that allows it to act as a data repository in addition to a key server. In these embodiments, in addition to providing security keys to CASM modules, the tag may be used as an external safeguard for certain data. For example, such an embodiment may comprise a personal information carrier of the type described with respect to FIG. 3 or may be used in a compound firewall as described with respect to FIG. 4.

Figure 4:
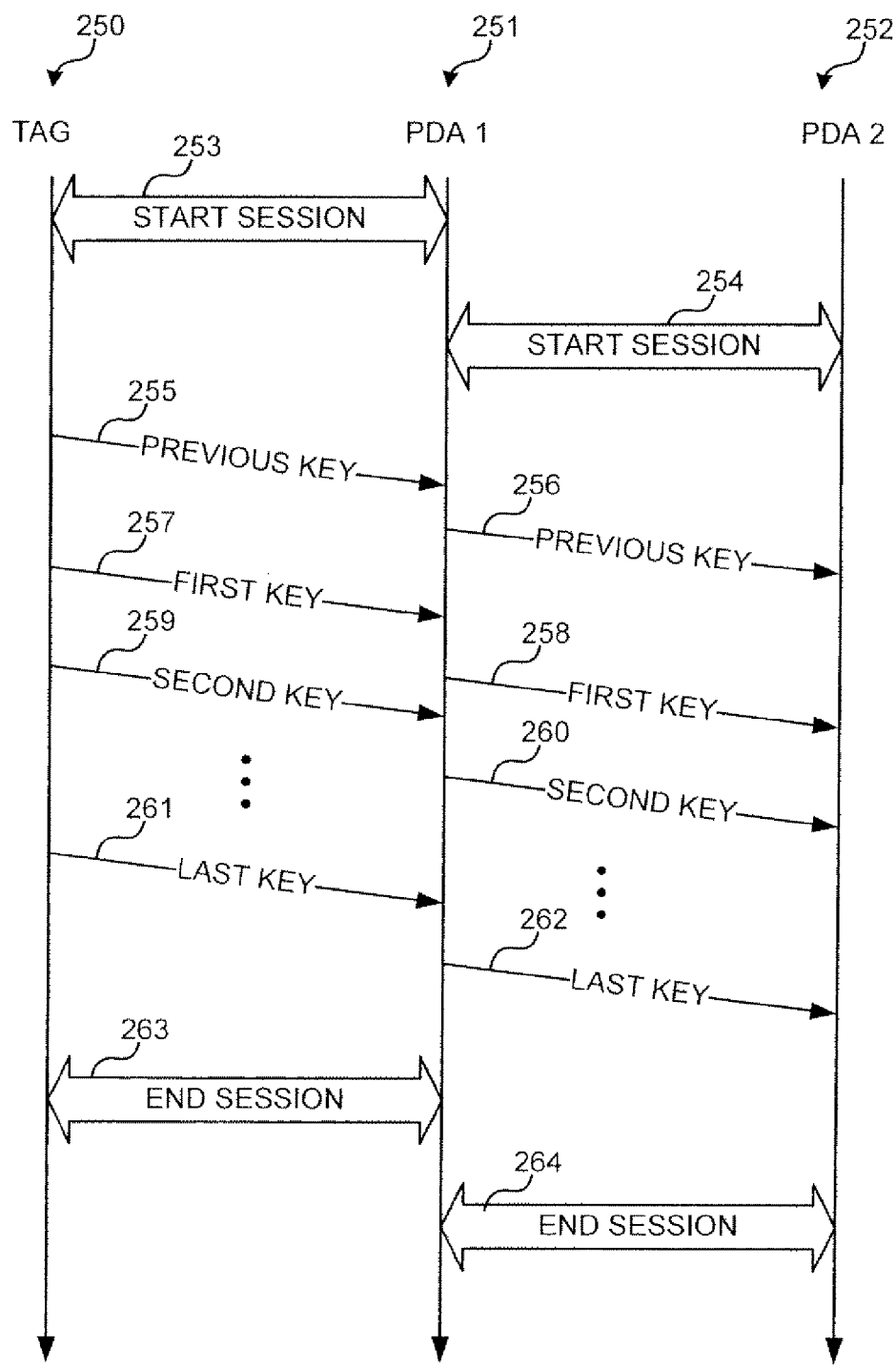
FIG. 4 illustrates a method of system operation implemented in accordance with an embodiment of the invention.

FIG. 4 illustrates a method of interaction between a security tag and a plurality of CASM enabled PDAs according to an embodiment of the invention. In some embodiments of the invention, CASM modules in a computing device are configured to receive encryption keys from an external source. For example, the CASM module may be provided with a private encryption key from an asymmetric encryption scheme that the CASM module can use to receive further encryption keys from an external source for use in encrypting the internal memory contents or communications in the embedded system. The received keys are then used in cryptographic functions to encrypt and decrypt data being written and read from internal memory, respectively. In some embodiments, the received keys are received from an authenticated security tag 250. Accordingly, in order to operate an CASM enabled computing device, a security tag 250 must be within sufficient physical proximity to allow a communications session between tag 250 and computing system 251. For example, the tag may be equipped with a transmitter limiting the physical proximity to less than 10 m or less than 5 m. In other embodiments, the security tag can be much further from the CASM enabled embedded system. For example, the security tag may comprise an encryption key server located at a base of avionic operations, and may be used to provide encryption keys to an embedded system to a distant avionic drone or vehicle.

In further embodiments, the received keys may also be received from other authenticated computing devices. Accordingly, a tag 250 may be able to provide keys to a computing device 252 that is not in physical proximity via an intermediary computing device 251, thereby creating a network of secured embedded systems.

In the illustrated process, a security tag 250 establishes a session 253 with a computing device such as a first PDA 251. In step 254, the first PDA 251 establishes a session 254 with a second PDA 252. In some particular embodiments, the communications session are established using Wi-Fi protocols and are authenticated using Wi-Fi's WPA2 encryption standards.

In some instances, a computing devices will have internal memory contents from a previous operation session, which will remain encrypted between operating sessions. In step 255, the security tag transmits the last key from the previous operating session. This allows the PDA 251 to decrypt the internal memory contents stored during the previous operation session. In step 256, the first PDA 251 relays the received previous key to the second PDA 252, enabling the second PDA to access its own internal memory.

In step 257, the tag 250 transmits the first key for the current operating session to the first PDA 251, which is retransmitted by PDA 251 to PDA 252 in step 258. The CASM modules embodied in the PDAs use the transmitted key to decrypt and re-encrypt the current memory contents using the newly transmitted key. Moreover, additional memory writes or reads are encrypted by the CASM modules using the new key, until an updated key is transmitted. In some embodiments, a separate key is used for each operating session, and steps 255-258 occur each time the PDAs 251 and 252 are activated. In other embodiments, key updates occur according to other parameters. For example, a key might be updated once an hour, or once a day, or once a minute. In still further embodiments, the embedded systems may be configured to cease operations, destroy their memory contents, or otherwise enter a restricted mode of operation if a key update is not received within a predetermined time.

In the illustrated embodiments, new keys are transmitted to the CASM modules with a predetermined frequency such that multiple keys are transmitted during a single operating session. In steps 259 and 260, a second key is transmitted to PDA 251 and relayed to PDA 252 during the operating session. The CASM modules on both PDAs then use the new key to re-encrypt the current internal memory contents using the new encryption key. This process is continued through steps 261 and 262 until the sessions are ended in steps 263 and 264. The number of times a new key is transmitted can vary significantly in various embodiments. For example, in some cases only a single new key is transmitted during an operating session, while in other embodiments, new keys may be transmitted millions of times. The security tag 250 then stores the last key transmitted in step 261 to send in the next communication session.

The methods used by the security tag 250 to generate new keys may vary in different embodiments. In some embodiments, the security tag may generate the keys itself, for example using a random process (for example, using a noisy diode number generation scheme) or a pseudorandom process (for example, using a cryptographically secure pseudorandom number generator (CPRNG)). In other embodiments, the security tag may be pre-programmed with predetermined keys, for example, the security tag may be pre-programmed with a key table of sufficient length for the particular application. In some embodiments, for additional security, the security tag is provided with enough keys or is provided with a CPRNG with a sufficiently long period that each key is only used once. As described above, when the tag transmits a key to a CASM enabled embedded system, it may instead transmit various primitives to allow the CASM enabled embedded system to derive the appropriate key or it may use various methods of secure key exchange, such as a public key encryption scheme, to send the encryption key.

In further embodiments, the CASM modules are programmed with a time limitation, within which they must be provided a new key. For example, a time limitation might be 1 hour. In such a case, after 1 hour, the internal memory data will be erased, partially, or completely, unless the security tag sends a new key. Although this requires that the security key and computing system remain in physical proximity, or come into physical proximity regularly, it can increase the security level of the computing system by placing a time limitation on decrypting the data in the internal memory.

In some embodiments, the security tag is placed in a physically secure, concealed, or inaccessible location. For example, the security tag is embedded in a wall of a building, buried under or embedded within concrete, or is implanted under the skin of a field operative. In these embodiments, a proximity distance surrounding the security tag is established that allows devices within that range to have a secured internal memory through a continuously operating process. In a particular embodiment, the secure location of the security tag allows the security tag to be used for anti-tampering or inventorying sensitive computing equipment. In this embodiment, the CASMs embodied on the computing equipment to be protected are configured to require a key update within a certain time limit, as described above. If this key update does not occur, then the CASMs are configured to erase the memory of the computing equipment, thereby protecting information stored on the computing equipment from theft. In these embodiments, if the security tag is not provided an external power source, it may be configured to have an extended mean time between recharges or replacement (MTBR). In some embodiments, the extended MTBR may be multiple years, for example, between 3 and 30 years, or more. This may be achieved in a variety of manners. For tags where the size is not a limiting factor, such as tags embedded in concrete or other locations in a building, the tags may be provided with a sufficiently large and stable power source for the extended operation. In other embodiments, methods of energy harvesting may be included in the security tag.

Figure 5:
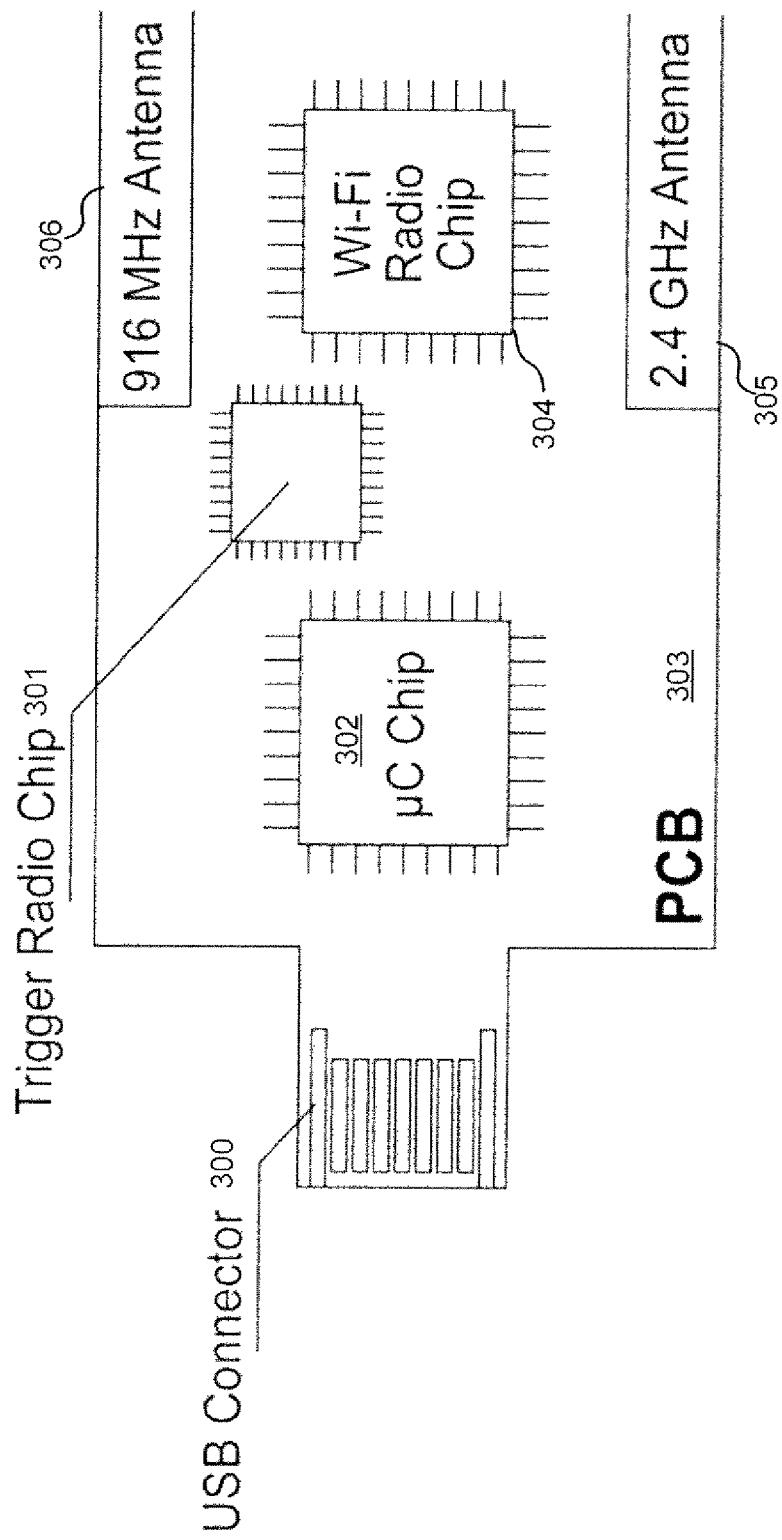
FIG. 5 is a schematic of an encryption key server implemented in accordance with an embodiment of the invention.

FIG. 5 illustrates an example PCB (Printed Circuit Board) which is in SLS (System Level Solution) integration. This system may comprise a personal information carrier, configured to store predetermined information on a flash memory (not pictured), which may be disposed on the other side of the PCB 303. For example, the illustrated system may be provided to patients in a hospital, to allow ready access to the patients" information by medical personnel. A USB connector 300 allows a hardwired interface between the system and an external computer system. For example, when connected to an external computer system through the USB connector 300, the system may behave as a typical flash memory USB drive. The system further comprises a first radio subsystem comprising a first antenna 306 coupled to a first radio controller 301. As described herein, the first antenna and radio controller may operate as a trigger radio, providing low power always-on reception of incoming data connection requests. A second radio subsystem comprises a second radio antenna 305 coupled to a second radio controller 304. In some embodiments, the second radio subsystem provides the bandwidth for wireless data transfer to and from the system with an external computer system, after the external system has been authenticated using the first radio subsystem. A microcontroller 302 is further disposed on PCB 303 and coupled to the various system devices. The microcontroller 302 is programmed with logic configured to allow it to perform the various functions described herein. In a particular embodiment, the system form factor can be small, such as 6 cm×2 cm×0.5 cm=6 cm$^3$, and the approximate weight can be calculated, assuming density of 2 g/cm$^3$ (silicon), or slightly lower, yielding 12 g-total weight.

Figure 6:
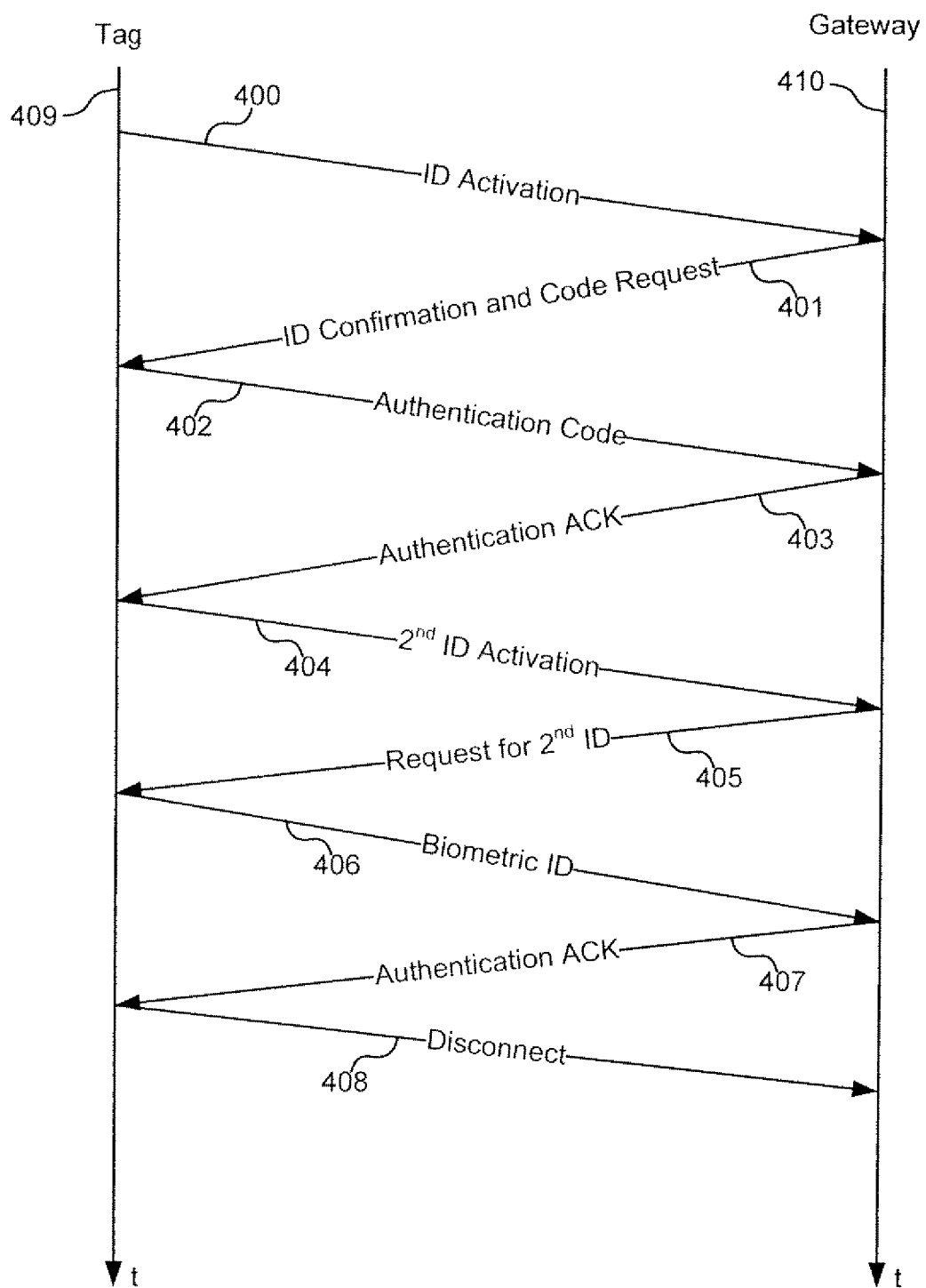
FIG. 6 illustrates a method of system operation implemented in accordance with an embodiment of the invention.

FIG. 6 illustrates an embodiment used for authorization and restricted access. In some embodiments, gateways 410 may be installed in restricted access locations. For example, access to a computer system 851 may be restricted to certain personnel, or the gateway 410 could be used to provide access to other systems, such as an area of a hospital or a particular vehicle. A tag wearer wishing to gain access to the area or object protected by the gateway 410, enters the proximity of the gateway 410 and transmits an activation request 400 to the gateway 410. Receipt of the activation request 400 triggers the gateway 410 to transmit a first authentication request 401. The tag then transmits an authentication code 402 that is preprogrammed into the tag 409. The gateway 403 then transmits an acknowledgement 403 of the code. In some embodiments, this first authentication process is sufficient for a first level of access. For example, a tag 409 may be worn by a hospital patient, or field personnel and may contain medical records of the wearer. The first authentication may be sufficient to allow the tag wearer access to a gateway protected medical record storage to allow the tag wearer access to upload recent changes to the wearer's medical condition.

In further embodiments, a second layer of authentication may provide increased protection for secure systems. This second layer may be required for access to further functionality, for example access to read or editing access to medical records, for access to a restricted area of a hospital, or for access to restricted access vehicle. For example, a second layer of protection may include a biometric authentication step, password authentication step, or other authentication step that is unique to the user of tag 409. In the illustrated embodiment, a tag wearer 409 transmits a second activation signal 404 to gateway 410. The gateway 410 transmits a request for the second authentication code or means of identification 405. In the present embodiment, a biometric signature 406 is input into the tag 409 by the user and transmitted to the gateway 410. For example, the tag 409 may comprise a device for input of a biometric signal, such as a fingerprint scanner or retinal imager. Or, in other embodiments the tag 409 may comprise a key pad or other input device to allow the tag user to input a user specific authentication code. After receiving the biometric ID signal 406, the gateway transmits an authentication acknowledgement signal 407 and allows the tag 409 or the tag user access to the restricted area or system. Although illustrated as disconnecting 408 after this process, in further embodiments, the gateway 410 and tag 409 may establish an on-going authentication process to ensure that tag wearer remains in proximity to the gateway during its access to the restricted system.

Figure 7:
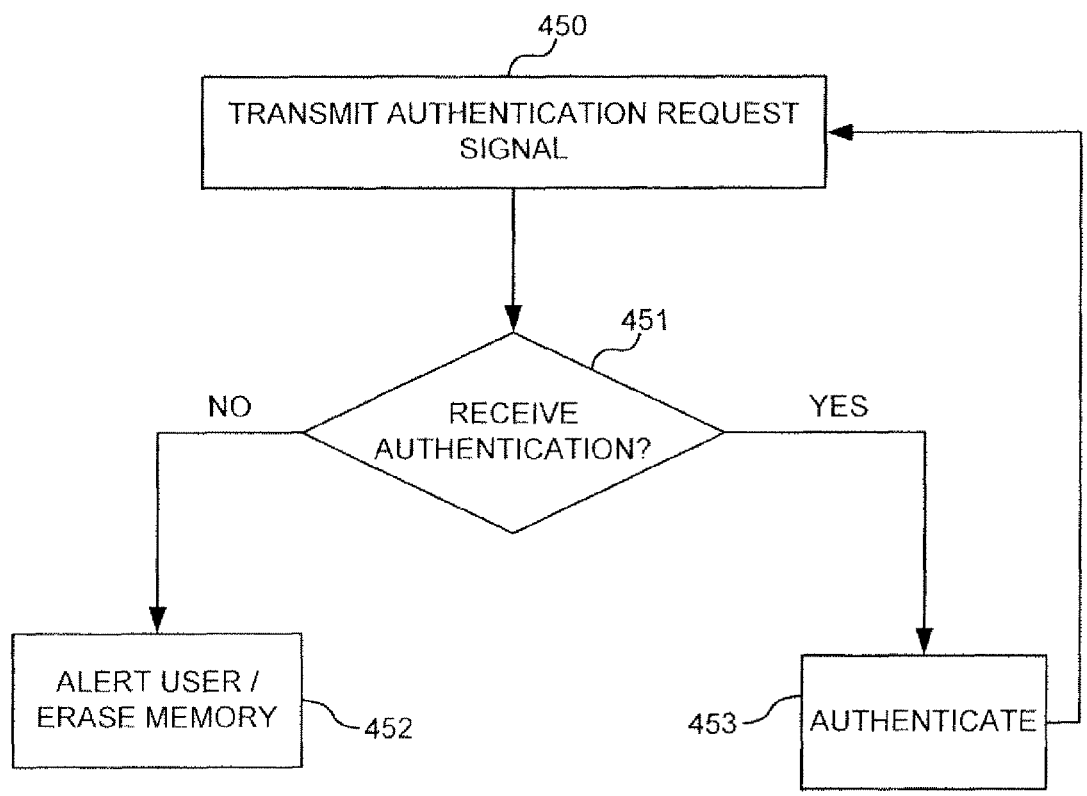
FIG. 7 illustrates a method of system operation implemented in accordance with an embodiment of the invention.

In a further embodiment, the gateway and tag system described with respect to FIG. 6 may be used for device tracking and security. In some cases, it is desirable to maintain a particular device or product within a certain predetermined area, and to avoid allowing that product or device to leave the predetermined area. FIG. 7 illustrates such an embodiment of the invention. In the illustrated embodiment, a gateway is coupled to a PDA, or other computer system to form a device tracker. A device to be tracked is then equipped with a tag. In the illustrated embodiment, rather than the tag providing authentication to the gateway, the gateway provides authentication to the tag. The tag emits an authentication request signal 450. These authentication signals may be used by gateways to locate and track tag equipped devices within their proximity. If the tag receives an authentication signal in step 451, then the tag authenticates that it is its correct location 453 and allows the device to continue operating. The tag is further programmed to repeat the method from step 450 at a predetermined frequency. If, in step 451, the tag does not receive an authentication from a gateway, then the device can determine that it has left its authorized area. In this case, various remedial measures can be taken, depending on the application. In one embodiment, the tag transmits an alert 452 to some remote location to alert a system user that the tag has left the authorized area. In another embodiment, the tag causes the device to erase its memory 452 or otherwise render itself inoperable. In a further embodiment, the tag does not erase the device's memory or its own memory after a first failed authentication attempt, but rather waits until a predetermined number of failed authentication attempts.

Figure 8:
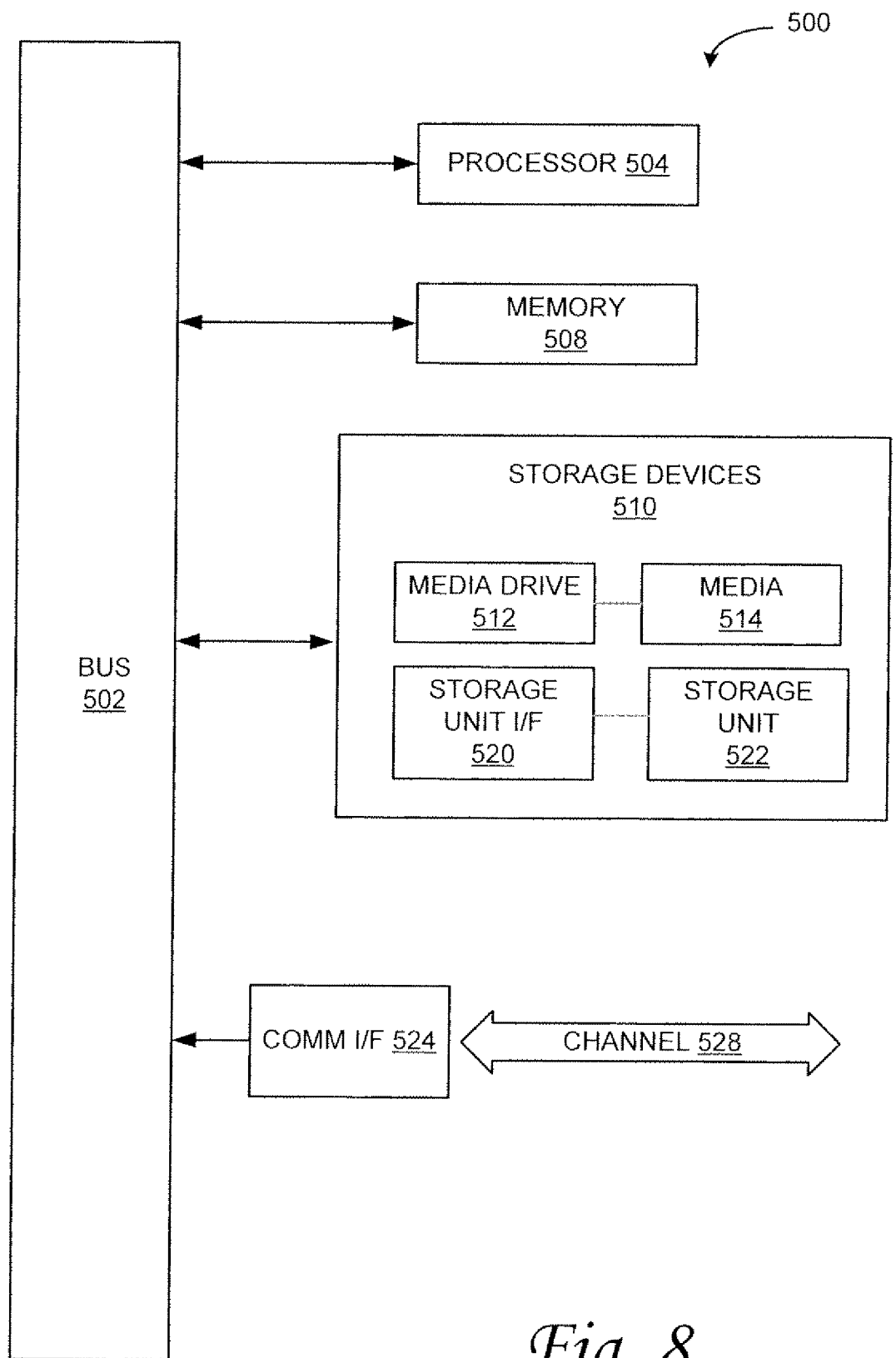
FIG. 8 illustrates an example computing module that may be used in implementing various features of embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 500. After reading this description, it will become apparent to a person skilled in the relevant art how to implement the invention using other computing modules or architectures.

Referring now to FIG. 8, computing module 500 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth) interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like, the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A non-transient computer usable medium having computer usable instructions embodied thereon, the computer usable instructions configured to cause a computer device to perform the steps of:
   receiving an intermediate program code from an unmodified host application prior to execution of the intermediate program code;
   recognizing data storage commands within the intermediate program code;
   inserting encryption commands into the intermediate program code prior to compilation of the intermediate program code by the operating system such that, during execution of the intermediate program code, the data is encrypted by the intermediate program code and, after encryption, the encrypted data is stored on a data storage device;
   recognizing data retrieval commands within the intermediate program code; and
   inserting decryption commands into the intermediate program code prior to compilation of the intermediate program code by the operating system such that, during execution of the intermediate program code, the encrypted data retrieved from the data storage device and the retrieved data is decrypted by the intermediate program code before being returned to the host application.

2. The computer usable medium of claim 1, wherein, upon execution of the modified intermediate program code, the computer device requests an encryption key to encrypt and decrypt the data from an external key storage device.

3. The computer usable medium of claim 2, wherein the encryption key is received from the external key storage device in an encrypted form using a public key encryption method, wherein the computer device maintains a private key corresponding to the public key encryption method.

4. The computer usable medium of claim 1, wherein the steps of recognizing and inserting are performed at run-time.

5. The computer usable medium of claim 1, wherein the steps of recognizing and inserting are performed prior to run-time.

6. The computer usable medium of claim 1, wherein the steps of receiving the intermediate program code, recognizing data storage commands, inserting encryption commands into the intermediate program code, recognizing data retrieval commands, and inserting decryption commands into the intermediate program code are performed during a current operating session, and wherein the computer usable instructions are further configured to cause the computer device to perform the steps of:
   recognizing a first set of data retrieval commands corresponding to data storage commands from a previous operating session;
   receiving an encryption key used during the previous operating session to encrypt data corresponding to the data storage commands from the previous operating session; and
   decrypting the data corresponding to the data storage commands from the previous operating session during the current operating session using the encryption key used during the previous operating session.

7. A system for encryption key management, comprising:
   an encryption key server configured to establish a current secure operating session with an embedded system, the embedded system comprising a processor, an embedded operating system, an internal memory, and an encryption module configured to encrypt data stored on the internal memory and communicated to the processor;
   wherein the encryption key server is configured transmit a previous encryption key used by the encryption module to encrypt data on the internal memory during a previous operating session, and
   the encryption module is configured to decrypt the data from the previous operating session using the previous encryption key;
   wherein the encryption key server is configured to transmit a current encryption key to the encryption module, and
   the encryption module is configured to use the current encryption key to encrypt data stored on the internal memory during the current operating session; and
   wherein the encryption module comprises a non-transient computer usable medium having computer usable instructions embodied thereon, the computer usable instructions configured to cause a computer device to perform the steps of:
      receiving an intermediate program code from a host application prior to execution of the intermediate program code;
      recognizing data storage commands within the intermediate program code;
      inserting encryption commands into the intermediate program code prior to compilation of the intermediate program code by the operating system such that, during execution of the intermediate program code, the data is encrypted by the intermediate program code and, after encryption, the encrypted data is stored on a data storage device;
   recognizing data retrieval commands within the intermediate program code; and
   inserting decryption commands into the intermediate program code prior to compilation of the intermediate program code by the operating system such that, during execution of the intermediate program code, the encrypted data is retrieved from the data storage device and the retrieved data is decrypted by the intermediate program code before being returned to the host application.

8. The system of claim 7, wherein the encryption module is configured to prevent operation of the embedded system unless a secure operating session is established with the encryption key server.

9. The system of claim 7, wherein the encryption module is configured to delete the data on the internal memory unless the encryption module receives encryption keys from the encryption key server at a predetermined rate.

10. The system of claim 7, wherein the encryption key server comprises a radio module configured to transmit encryption keys only to embedded systems within a proximity distance.

11. The system of claim 10, wherein proximity distance is less than 5 meters.

12. The system of claim 10, wherein proximity distance is less than 10 meters.

13. The system of claim 7, wherein the step of transmitting the previous encryption key comprises encrypting the previous encryption key using a public encryption key of a public encryption method, wherein a private encryption key of the public encryption method is stored on the embedded system.

* * * * *